March 1, 1949.  R. S. COOMBS  2,463,088
AUTOMOBILE SIGNAL
Filed Sept. 6, 1947
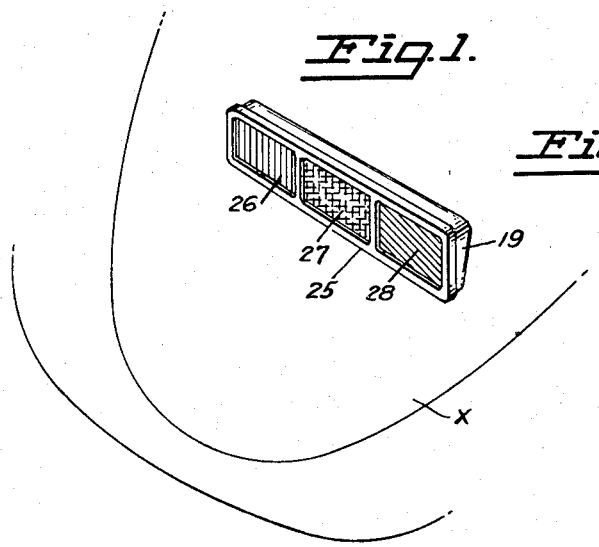
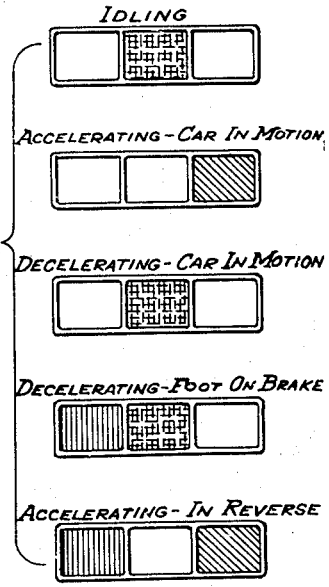
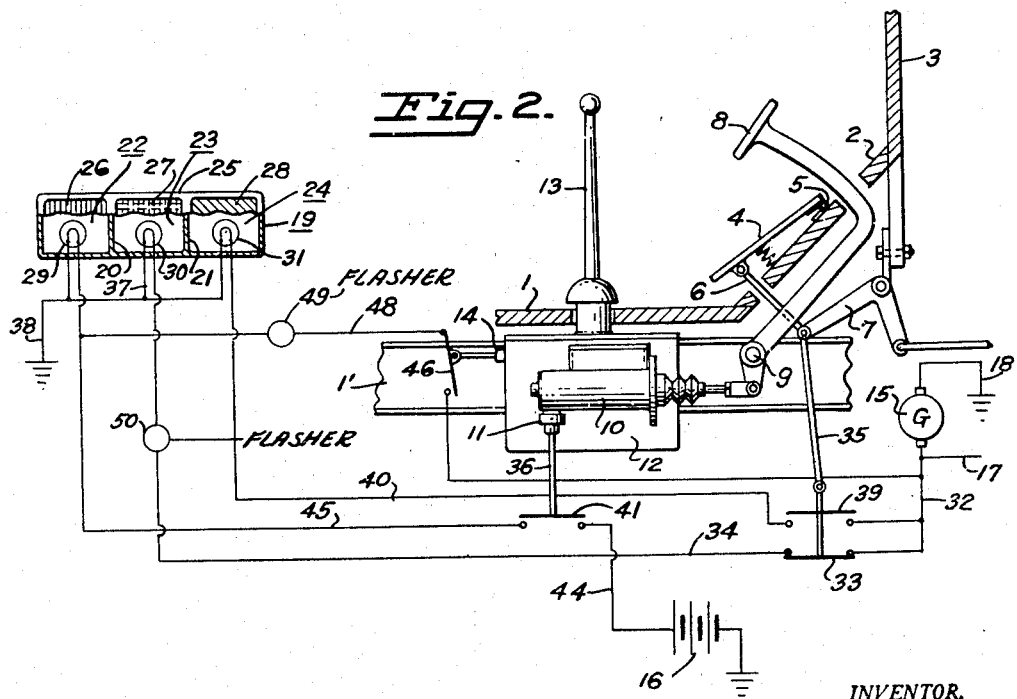
INVENTOR.
ROBERT S. COOMBS
BY
ATTORNEY Patented Mar. 1, 1949

2,463,088

UNITED STATES PATENT OFFICE 2,463,088

AUTOMOBILE SIGNAL

Robert S. Coombs, San Francisco, Calif.

Application September 6, 1947, Serial No. 772,568

1 Claim. (Cl. 177—337)

This invention relates to automobile signals and more particularly to automatic electric signals on motor vehicles, the present application being a substitute for my abandoned application, Serial No. 338,573, filed June 3, 1940.

Among the objects of the invention is the provision of visual illuminated signals on the rear portion of a motor vehicle, indicating the functional adjustments existing in the vehicle.

Another object is to make such signals independent of the direct selective control of the driver of the vehicle, and to automatically indicate the adjusted condition of the functional motive means of the vehicle, such as the motor, accelerator, brake and reverse gear of the vehicle.

The behavior of the drivers of automobiles in the present state of high speed and congested traffic is unpredictable. The prescribed arm signals are not always given correctly, if at all, nor in time to avoid mishaps. By means of the present invention, the driver of the trailing vehicle is kept informed of the running condition of the vehicle ahead, independent of the voluntary signaling of the driver of the leading vehicle.

Other objects and advantages will appear as the description proceeds. In the specification and the accompanying drawings the invention is disclosed in its preferred form. But it is to be understood that it is not limited to this form; because it may be embodied in modifications within the spirit of the invention as defined in the claim following the description.

In the one sheet of drawings:

Fig. 1 is a perspective view from the rear of the multiple signal box adapted to be attached to the desired portion of the vehicle body, preferably at the rear, in accordance with this invention.

Fig. 2 is a diagrammatic view in vertical section of the foot and hand controls for the motive mechanism of a motor vehicle having a wiring diagram associated therewith relating to the present invention.

Fig. 3 is a series of diagrammatic views with explanatory legends showing the color combinations of the various signals under running conditions.

In detail the structure illustrated in the drawings, referring first to Fig. 2, comprises the conventional floor board 1, the foot board 2 and the dash 3. The accelerator foot pedal 4 is pivoted at 5 to the foot board 2 and has the push rod 6 pivoted thereto and to the throttle control linkage 7, in the usual manner.

The brake pedal 8 is pivoted to the car frame 1', and to the brake actuating mechanism 10, which may be of any conventional form. The hydraulic type shown has the switch actuating accessory 11 for operating the conventional Stop light.

The gear box 12 has the gear shift lever 13, or other means for shifting gears, and the sliding guide 14, that usually projects beyond the gear box.

The source of electric current includes the generator 15 driven by the motor of the vehicle, and the battery 16 that is charged by the generator 15. The current flows from the generator 16, through the wire 17 of the usual distributing circuit and back through the ground as at 18. This distributing circuit includes the usual lighting system, ignition and other electrically operated instruments. Thus far the mechanism described is conventional in automotive practice with variations to meet special conditions.

The present invention includes the enclosing case 19, Fig. 1, adapted to be mounted on the car body X in any suitable manner, where it will be easily visible from the rear of the car. This case 19 has the partitions 20, 21, that divide the case into three compartments 22, 23, 24, see Fig. 2. The front of the case has the cover 25, in which the glass panes 26, 27, 28 are mounted and which cover their respective compartments in the colors red, yellow and green, or other contrasting colors respectively.

Each compartment has a light bulb 29, 30, 31, respectively. These various lights are in subcircuits having switches automatically operated by the vehicle brake, accelerator and gear shift mechanism, respectively.

It is the intention that the yellow Caution light 27, will function continuously while the motor is running, except when the accelerator 4 is depressed. When the accelerator is released it closes the switch 33, and the current flows from the generator 15 over the wires 32—34 through the flasher 50 and lamp 30 to ground.

Depression of the accelerator and the link 35, closes the switch 39 and opens the switch 33, causing current to flow from the generator 15, over the wire 32, the switch 39, the wire 40, through the light bulb 31, and the ground wire 38 back at 18 to the generator 15. When the accelerator is released it opens the switch 39 and closes the switch 33, restoring the yellow Caution signal circuit previously described.

When the foot brake 8 is depressed it advances the rod 36, closing the switch 41 and flashes the red Stop signal 26. The current flows from the battery 16 over the wire 44, the closed switch 41, the wire 45, through the bulb 29 and back to the battery 16, over the ground 38 completing the circuit. The battery 16 is included in a part of the red Reverse circuit, to afford a stop signal at all times. As a precaution in coasting it is usual to have the transmission in gear at 13. The switch 46 is closed only when the gear shift lever is placed in reverse. The current flows from the generator 15 over the wire 32 and 47, switch 46, wire 48, through flasher 49, the bulb 29 and back to the generator over the ground 38—18.

It is preferable to connect the conventional stop light control at 11, and combine the Reverse light signal with the other signals in the case 19, as shown. It is impossible to predict the temperamental behavior of a motor vehicle driver, but it is important to traffic safety that other drivers know the functional condition of adjacent vehicles.

Only the foot accelerator control has been illustrated, but in the older cars the hand throttle control is usually connected with the linkage beyond the crank 7, with the same results above described in connection with the foot type accelerator.

For simplicity and clarity the electric switches in the various sub-circuits have been symbolically indicated in the wiring diagram. There are numerous types of switches in the automotive practice available, for adapting this invention to the various types of motor cars and transmission gearing. These various switches can be located on the vehicle in accordance with the specific construction of the actuating means such as the brake, accelerator, and gear shift mechanisms, which automatically actuate these switches without direct manual control which would defeat the main objectives of the invention.

The invention operates substantially as follows: When the motor is idling and the vehicle stopped, the yellow Caution signal 27 is illuminated by current from the generator 15 only, the switch 33 being then normally closed. If the brake is on, the switch 41 is closed and current will flow from the battery 16, as described, insuring a Stop signal.

When the gear shift lever at 13 is moved to throw the vehicle transmission into reverse gear with the motor running, the switch 46 is closed and the red animated Reverse signal 26 is illuminated by the generator circuit.

When the accelerator 4 is depressed the switch 33 is opened and the animated Reverse signal 26 continues to operate, and the Caution signal 27 is cut off from the generator 15, and the green Go signal 28 is illuminated through the closed switch 39, by current from the generator 15. The green Go signal indicating to the following traffic that the vehicle is reversing under acceleration at 4. When the accelerator 4 is released the switch 39 opens and the switch 33 closes and illuminates the yellow Caution signal 27, indicating a slow down in speed of the vehicle.

For a more compelling attraction of attention to the various signals, the circuits 49—50 are equipped with the conventional thermostatic circuit breaking flashers.

Having fully described this invention and its mode of operation, what I claim and desire to secure by Letters Patent is:

A signaling system for motor vehicles including a generator driven by the rotation of the motor of the vehicle, a battery, a Caution signal light, a circuit extending from said generator to said signal light, a normally open switch in said circuit, a Go signal light, a circuit extending from the generator to said Go signal light, a normally open switch in said last mentioned circuit, said Caution signal light switch and Go signal light switch being both connected with the motor accelerating means to be simultaneously actuated thereby to open the Caution signal light switch to extinguish the same when the Go signal light switch is closed and the Go signal light is illuminated, and to close the Caution signal light switch when the Go signal light switch is open and this light is extinguished, whereby the Caution signal light switch is closed at all times and the Caution signal light illuminated except when the Go signal light switch is closed, and a combined Stop and Reverse signal light, a circuit extending from said generator to said Stop and Reverse signal light, a normally open switch in said last mentioned circuit connected with the vehicle transmission to be closed thereby when the transmission is operated to put the same in reverse gear, a circuit extending from the battery to the combined Stop and Reverse signal light, a normally open switch in said last mentioned circuit connected with the vehicle braking mechanism to be closed thereby to illuminate this signal light, said Caution signal light switch and said combined Stop and Reverse signal light switch being both closed when the braking mechanism is operated to stop the vehicle, and the switch of the combined Stop and Reverse signal light and the switch of the Go signal light being both closed and these signal lights illuminated when the motor is accelerated with the vehicle transmission in reverse gear and the vehicle is moving rearwardly.

ROBERT S. COOMBS.

REFERENCES CITED

The following references are of record in the file of this patent:

UNITED STATES PATENTS

| Number | Name | Date |
|---|---|---|
| 1,469,337 | Sanborn | Oct. 2, 1923 |
| 1,719,394 | Daniel | July 2, 1929 |
| 1,919,206 | Douglas | July 25, 1933 |
| 1,956,056 | Bellec et al. | Apr. 24, 1934 |
| 2,096,069 | Seiden | Oct. 19, 1937 |
| 2,128,769 | Finnell | Aug. 30, 1938 |